July 16, 1963 S. C. ODEN 3,097,655

SMOKING PIPE

Filed Feb. 29, 1960

INVENTOR
SHALMY C. ODEN

BY *Price and Heneveld*

ATTORNEYS

United States Patent Office 3,097,655
Patented July 16, 1963

3,097,655
SMOKING PIPE
Shalmy C. Oden, 1593 Jefferson St., Muskegon, Mich.
Filed Feb. 29, 1960, Ser. No. 11,732
1 Claim. (Cl. 131—207)

This invention relates to a smoking device and more particularly to a smoking pipe.

This application is a continuation-in-part of my copending United States application Serial No. 639,357, filed February 11, 1957, and entitled Smoking Device, now abandoned.

Smoking devices of all descriptions today often contain some type of filter. These filters take many different forms and are constructed from various filter materials. The filter may consist of a sheet which is wadded up and placed into a chamber through which the smoke passes as in my copending application entitled Smoking Device referred to hereinbefore. Other types of filters are of the molded variety, taking the specific form of the chamber in which they are inserted. These are but a few of the various types of filters used.

When using a filter such as the sheet-type which can be crinkled and inserted into the filter chamber, a portion of the filter may be drawn into the bore of the stem causing plugging and prevention of passage of smoke. This is an undesirable feature in a smoking device.

After smoking the pipe containing a filter several times, it is desirable to change the filter since it becomes saturated with various ingredients from the smoke and loses some of its effectiveness particularly after extreme saturation. The filter after long usage is rather a messy object to remove from the filter chamber of the pipe. Therefore, it is desirable to have some hooklike mechanism with which to grasp the filter and withdraw it from the chamber.

Applicant has solved several of the above problems by providing the stem of the pipe with a combination hook and shield member. The hook and shield member is designed so as to prevent the filter material from being drawn into the bore of the pipe stem. This same member extends beyond the end of the pipe stem and is formed into a hooklike object. When it is desired to remove the filter, the stem can be removed from the pipe and the hook is readily available to engage the filter and withdraw it from the chamber. The hook can also be used to insert the fresh filter into the filter chamber.

Considerable moisture is liberated in the filter chamber due to the liberation of water when hydrocarbons are burned. It is desirable to prevent the accumulation of excessive moisture in the filter chamber since if the filter becomes over saturated with moisture and smoke impurities, its effectiveness is reduced. The filter chamber is provided with evaporation ports which greatly reduce over saturation. The evaporation has a cooling effect on the smoke since any type of evaporation results in cooling.

The large surface area of the filter chamber adjacent the bowl provides a cool condensing surface where the vapor will condense. The filter acts as a wick which conveys the moisture to the area of the evaporation ports where evaporation takes place.

It is an object of this invention to provide an improved smoking device.

Still another object of this invention is to provide a smoking device having a filter chamber capable of receiving any type of filter material.

A further object of this invention is to provide a smoking device which has the bore of the stem protected from the filter material.

Yet another object of this invention is to provide a pipe that has a means formed integral therewith for removing and inserting a filter.

Another object of this invention is to provide a pipe having a combination filter shield for protecting the bore and hooklike means for removing and inserting the filter.

Yet another object of this invention is to provide a pipe which is easily assembled and disassembled for cleaning purposes.

Other objects of this invention will become obvious upon reading the following specification in conjunction with the accompanying drawings, wherein.

Figure 1:
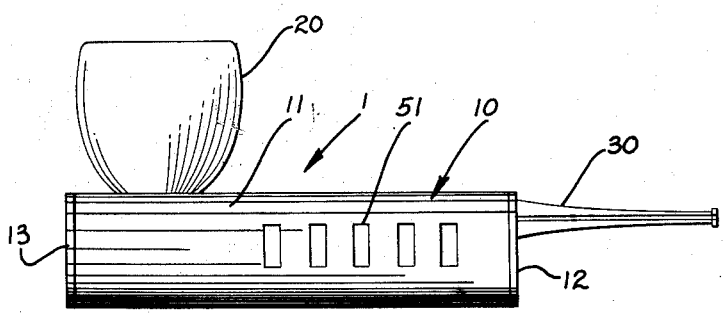
FIG. 1 is a side elevational view of a smoking pipe made in accordance with this invention.
Figure 2:
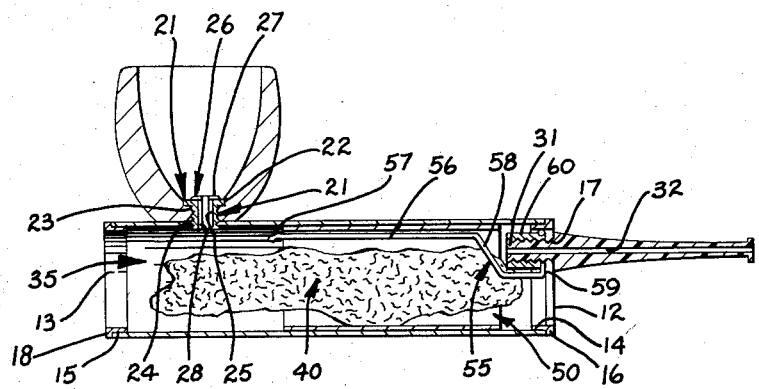
FIG. 2 is a central vertical cross sectional view of the pipe shown in FIG. 1.

Referring to the drawings, reference number 1 designates a smoking pipe assembly which includes the housing 10, the bowl 20, the stem 30 and the housing end caps 12 and 13. FIG. 2 shows a cross sectional view of FIG. 1 and discloses the hook and shield member, generally designated as 55.

The pipe housing member 10 has a main body portion which is an elongated tubular member 11. The hollow portion of the tubular member 11 constitutes the filter chamber of the pipe. The tubular member 11 is provided with evaporation ports 51 which extend therethrough and are preferably positioned in alignment along diametrically opposite sides of the tubular member. The tubular member 11 is also provided with an aperture 24 which is adapted to receive a fitting which secures the pipe bowl 20 to the housing 10.

The tubular member 11 has its open ends covered by caps 12 and 13. The caps 12 and 13 have neck portions 14 and 15 and flange portions 16 and 18 respectively. The neck portions engage the inner periphery of the tube 11 and the flange portions abut against the ends of the tube to close the same. This provides a substantially airtight fitting for the ends of the tube. The cap 12 is provided with a threaded aperture 17 which receives a threaded reduced end 31 of the stem 30. The end 31 of stem 30 is secured to the cap 12 by being threaded thereon. The stem 30 is provided with a bore 32 extending longitudinally therethrough whereby the smoke may be drawn from the filter chamber to the smoker's mouth.

The aperture 24 formed in the tube 11 is adapted to receive a fitting, generally designated as 21, which fits within the tobacco bowl 20 and is generally T-shaped in vertical section. The bowl 20 is provided with a horizontal countersunk bore which receives the shoulder 22 of the fitting 21. The threaded neck 23 of the fitting 21 extends through the bore of the bowl 20 and threads into the aperture 24, thereby securing the bowl 20 to the tubular member 11. The shoulder 22 of the fitting 21 may be provided with a horizontal slot 27a adapted to receive the blade of a tool such as a screwdriver for securing the bowl 20 to the tube 11. The fitting 21 is provided with a bore or draw hole 25 which provides a communication passage between the bowl 20 and the filter chamber. The bore 25 may be provided with a hollow insert 26 which is generally T-shaped in vertical section and is made of insulation material having a shoulder portion 27 that rests upon the shoulder 22 of the T-shaped fitting 21 and a neck portion 28 which extends through the bore 25. Insert 26 helps prevent condensation from forming in the draw hole of the T-shaped fitting 21 and thus prevents stopping up of the draw hole at the bottom of the bowl. The entire fitting may be made of insulating material.

The tube 11 contains an evaporator tube 50. This evaporator tube lies immediately adjacent the inner periphery of tube 11 and is of sufficient longitudinal extent to cover the evaporation ports 51 formed in the tube 11. The evaporator tube 50 is composed of a hygroscopic material such as filter paper which will absorb the condensate or moisture formed within the filter chamber. This moisture is then allowed to escape to the atmosphere by a process of evaporation through the evaporation ports 51. The tube 50 is not completely airtight and allows some air to penetrate into its interior from the ports 51, the amount of penetration depending on the porosity and fit of the tube 50 in the tube 11. This air inlet is not near the bowl and cannot be stopped up. As the moisture evaporates a reduction in temperature is brought about thus cooling the smoke.

The threaded reduced end 31 of stem 30 projects into the filter chamber of tube 11. The stem portion 31 is adapted to carry the support portion of the hook and shield member 55. The hook and shield member 55 is constructed by bending a piece of relatively stiff wire; however, within the broadest scope of the invention other material in the form of a flat strip or other configuration may be used to construct the hook and shield member. The support portion 59 is formed so as to partially encompass the stem end portion 31. A clamping nut 60 is threaded on the threaded end portion 31 and clamps the support portion 59 between itself and the inner surface of cap 12. The hook and shield member continues from the support portion 59 to the outwardly projecting end of threaded stem portion 31 and is bent so as to be positioned in front of the stem bore 32. The portion of the hook and shield member in front of the stem bore 32 is the shield portion 58 of the hook and shield member and is positioned at an angle with respect to the bore 32 so that the bore is not covered to the point of preventing smoke from being drawn through the bore. The hook arm 56 is formed integral with the shield portion 58, projects along the inner periphery of the evaporator tube 50, and extends into the filter chamber to a position approximate the base of the bowl 20. The end of the hook arm 56 is bent so as to form a hook 57.

The stem 30, cap 12 and hook and shield member 55 form a unit, and when the cap 12 is removed from the tube 11, the stem 30 and hook and shield member 55 are removed simultaneously. The tube 11 interior which forms the filter chamber is adapted to receive some type of filter material 40. The filter may be composed, for example, of a sheet of absorbent tissue, or of a handkerchief, paper toweling, etc., which is crinkled and stuffed into the filter chamber formed within the tube 11. The filter material 40 may be stuffed into the filter chamber by the hook 57 of the hook and shield member 55. In placing the cap 12 on the tube 50 the hook 56 is directed along the inner periphery of the evaporator tube so that it will pass over the filter material. The hook 57 can be used to withdraw the filter material 40 from the filter chamber after it has been used, in a manner similar to its use for inserting a filter. The shield portion 58 of the hook and shield member 55 is positioned in front of the stem bore 32 so as to prevent the smoker from drawing the filter material 40 into the bore 32. Thus, the hook and shield member 55 performs the double function of preventing the filter from being drawn into the bore 32 and provides a means for withdrawing and inserting the filter material 40.

The end of the hook member can also be made wedge shaped or knife shaped and used for cleaning or chipping the bowl. Also, the hook and shield member need not be formed as an integral member nor is it necessary that they be secured to the stem 30 of the pipe.

The filter material 40 also acts as a wick for conveying moisture from the condensation surface area 35 of the housing 10. The condensation area is the area of the housing from where the evaporator tube 50 terminates within the housing, to the cap 13. The filter material acting as a wick conveys the moisture to the evaporator tube 50 where it escapes to atmosphere through the evaporator ports with resultant cooling.

Modification

Figure 3:
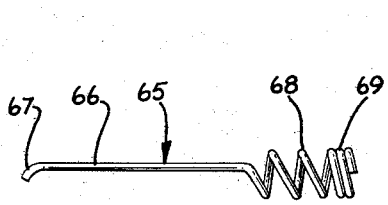
FIG. 3 is a side elevational view of a modified form of the hook and shield member.
Figure 4:
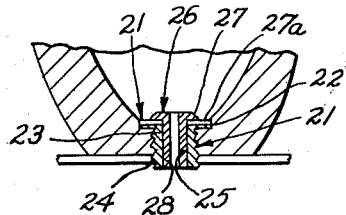
FIG. 4 is an enlarged fragmentary view of FIG. 2.

FIG. 3 shows a modified form of hook and shield member designated generally as 65. Although the hook and shield member 65 is constructed somewhat differently than the hook and shield member 55, they both perform the same functions. Thus, the hook and shield member 65 may be used interchangeably with the hook and shield member 55.

The hook and shield member 65 is constructed from a wire and has a support portion 69 which is in the form of a helix. The support portion 69 is adapted to thread upon the threaded end portion 31 of the pipe stem. With the modified form of hook and shield member 65, the clamping nut 60 is not necessary, since the member is self-supporting. The shield portion 68 is formed by continuing the helix in a loosely wound manner. The hook arm 66 is formed integral with the end of shield 68 and is a straight member which projects inwardly into the filter chamber. The end of the hook arm 66 is bent to form the hook 67. The hook 67 is used to insert and withdraw filter material such as 40 from the filter chamber, and the shield portion 68 prevents the filter from being drawn into the stem bore 32.

Assembly and Operation

The pipe elements are assembled upon the pipe housing 10. The tubular member 11 is provided with an evaporator tube 50 which is positioned within the hollow tube 11 so as to cover the ports 51. The cap 13 is applied to the end of the tube 11 which will support the bowl 20. The other cap 12 is provided with a stem 30 by screwing the reduced end portion 31 into aperture 17. The threaded end portion 31 of stem 30 is then provided with a hook and shield member 55 by placing the support portion 59 thereof about the stem 31 and securing it in place by threading and securing the clamping nut 60 thereupon. If the alternate hook and shield member 65 is to be used, it is installed upon the stem end portion 31 by merely threading the support portion 69 thereupon. The filter material 40 is next inserted into the filter chamber by means of the hook 57 and the cap 12 placed in position upon the opposite end of the tube 11. The bowl 20 is placed in position over the aperture 24, and the T-shaped fitting 21 is inserted through the bore formed in the bottom of bowl 20, threaded into aperture 24, and drawn tight. The T-shaped fitting 21 can be provided with an insulated insert 26 by insertion thereof in bowl bore 25.

The pipe is filled and lighted in a conventional manner. The smoke travels from the bowl through the hollow insulated insert 26, the filter material 40, and the stem bore 32 to the smoker's mouth. The smoke is filtered by the filter material 40. Condensation forming within the filter chamber will accumulate on the evaporator tube 50 and will evaporate through the ports 51. When the filter material 40 becomes saturated with nicotine, tar and other articles filtered from the smoke, and it is desired to remove the filter, the cap 12 is drawn from the tube 11 and the hook 57 is used to withdraw the filter from the filter chamber. Thereafter new filter material is inserted within the filter chamber and the pipe is again ready for use.

It can be seen that applicant has disclosed an improved form of filter pipe. Applicant has provided the draw hole between the bowl and filter chamber with an insulated insert which will prevent the forming of condensation in the draw hole and thereby prevent clogging of the draw hole. The interior of the tube 11 provides a large filter chamber which can be provided with a sufficient quantity of filter material to adequately filter the smoke. The tube 11 is also provided with means for evaporating moisture which forms therein, thereby lengthening the life of the filter and providing for a better smoke over a longer interval than was previously possible. The hook and shield member secured to the stem of the pipe provides a means of preventing the filter from entering the bore of the stem and thereby impairing the drawing qualities of the pipe, and further provides a sanitary means for withdrawing the messy filter from the filter chamber and a means for inserting the new filter. The pipe can be easily assembled and disassembled for cleaning purposes which prevents the pipe from becoming "strong," thereby lengthening its useful life.

While preferred embodiments of this invention have been described, it will be understood that further modifications and improvements may be made thereto. Such of these modifications and improvements as incorporate the principles of this invention are to be considered as included in the hereinafter appended claim unless this claim by its language expressly states otherwise.

I claim:
A smoking pipe comprising: a bowl; a smoke conduit from said bowl; a generally cylindrical body defining a filter chamber of sufficient size to receive a loosely wadded, randomly disposed sheet of soft, smoke-pervious cellulosic fibrous material substantially filling said filter chamber; a stem having a smoke passage formed therethrough, said conduit and passage terminating in said chamber at opposite ends thereof, said stem being detachable from said chamber; and a hook-and-shield member substantially in the form of a bent wire having an attachment portion fixedly holding it to said stem, a shield portion adjacent said attachment portion, said shield portion extending diametrically across the inner end of said smoke passage close thereto but spaced therefrom so as to form a barrier to prevent said sheet from coming into contact with said inner end but allow smoke to enter said inner end, a central portion extending throughout the length of said filter chamber adjacent the perimeter of said cylinder so as to avoid confining said sheet, and a radially inwardly turned hook portion at its end most remote from said stem for engaging said sheet and pulling it out of said chamber when said stem is detached and moved away from said chamber.

References Cited in the file of this patent
UNITED STATES PATENTS

| | | |
|---|---|---|
| 134,713 | Turner | Jan. 7, 1873 |
| 379,585 | Malinckrodt | Mar. 20, 1888 |
| 861,090 | Clapp | July 23, 1907 |
| 1,103,134 | Elam | July 14, 1914 |
| 1,114,274 | Loflin | Oct. 20, 1914 |
| 2,100,051 | Hallner | Nov. 23, 1937 |
| 2,200,237 | Kirsten | May 7, 1940 |

FOREIGN PATENTS

| | | |
|---|---|---|
| 22,124 | Great Britain | 1894 |
| 216,097 | Great Britain | Jan. 22, 1925 |
| 745,245 | Great Britain | Feb. 2, 1956 |